United States Patent Office 3,171,867
Patented Mar. 2, 1965

3,171,867
COOLING TOWER IMPROVEMENT
Paul A. Frohwerk, Shawnee Mission, Kans., Eugene L. Bass, Kansas City, Mo., and Leonard D. Hamlin, Shawnee Mission, Kans., assignors to J. F. Pritchard & Company of California, Kansas City, Mo.
Filed Nov. 1, 1962, Ser. No. 234,811
5 Claims. (Cl. 261—24)

This invention relates to improvements in cross flow cooling towers and refers more particularly to improvements in the vertical positioning and baffling of the fan or air flow creating device within the tower structure.

A "cross flow" cooling tower is one in which the liquid to be cooled passes downwardly through the tower, while air flows substantially horizontally within the tower, transversely of the direction of water flow. Conventionally, in such tower, the liquid passes downwardly from upper sprinklers or like devices, successively engaging a series of decks. Each said deck is typically formed from a large number of spaced slat members, on and between which the water forms a film and water droplets from which the moving air readily absorbs heat. The air flow or draft (when forced air draft is employed) is conventionally produced by a fan or like means positioned centrally of or to one side of the top of the tower structure, whereby to vertically draw air centrally or at one side of the tower. The vertical air flow created by the fan means is translated into lateral or horizontal air flow to the side or sides of the fan zone in the cooling tower due primarily to the decking structure previously described and also to flow sealing of the tower around the fan housing.

In cooling tower constructions utilizing a centrally located fan, such fan draws air horizontally inwardly in two opposite directions from opposite sides of the cooling tower housing.

Typical conventional cooling tower constructions are seen in the patents to Coey 1,929,410, issued October 10, 1933 "Cyclic Cooling Tower" and Mart et al. 2,672,328, issued March 16, 1954 "Water Power-Driven Fan for Mechanical Draft Cooling Towers."

In previous cross flow tower installations wherein air flow producing means or fans have been employed either centrally of or to one side of the structure, a number of serious problems have arisen. Thus, where a fan is located at the top of a vertical well in the tower, with one or more sides of the well communicating with splash decking as previously described, there is an evident quantity of differential or difference between the air flow at the top of the structure and the air flow adjacent the bottom thereof. This difference is due to the fact that the greatest fan suction or draft power occurs next to the fan and adjacent the top of the tower and the least at the bottom thereof. A quantity gradient of flow thus is established with a far greater volume of air drawn in the top levels of the tower and a far lesser quantity drawn therebelow. The optimum air flow distribution would be uniform across the entire height of the decking.

Difficulties which arise with respect to the unequal drawing of air through the different vertical portions of the tower include an excessive tendency of horizontally moving air at the top of the structure to carry some water horizontally with it, with the particular result that by the time the water reaches a lower portion of the tower it has shifted inwardly, away from the air inlet side or sides of the tower, thus not covering the deck structures near the sides completely enough for heat transfer efficiency in such area. This condition has resulted in various types of baffling attempts to compensate, but all additional baffling results in severe pressure drop problems. The latter increases the required power of the fan unit. Yet further, such baffling usually results in an increase in width or diameter of the tower with considerably greater structural costs. Lesser air flow in the lower portions of the decking parts of the tower also results in non-use of available heat exchanging area due to insufficient air flow. Thus, achievable cold water temperature and range of hot to cold both suffer in such a tower construction.

An object of the invention is to provide an improved cross-flow cooling tower construction.

Another object of the invention is to provide an improved type of fan mounting and location for a cross-flow type cooling tower construction.

Another object of the invention is to provide a cooling tower construction of cross-flow type wherein the upper portion of the water flow decking is baffled to a certain degree yet wherein pressure drop is minimized.

Another object of the invention to provide a means in a cross-flow cooling tower construction for making the air flow through the entire vertical section of the heat exchange portion more uniform and very substantially uniform in most cases without substantial increase in resistance to air flow.

Another object of the invention is to make uniform the air flow through the entire vertical height of a cross-flow cooling tower while increasing the efficiency thereof and without greatly increasing the cost thereof.

Another object of the invention is to provide a recessed fan cross-flow cooling tower construction wherein the fan, its drive and all parts thereof are as readily available for inspection, repair or replacement as in a top mounted fan, yet wherein the fan and its housing are entirely received within the cooling tower housing.

Another object of the invention is to provide a cross-flow cooling tower construction with improved cold water temperture characteristics and a greater range of hot to cold water temperatures with respect to same.

Another object of the invention is to provide across-flow cooling tower construction wherein all of the problems of uneven distribution of air flow within such towers are resolved completely with a minimum of expense and a minimum of structural change to the typical tower construction.

Another object of the invention is to provide improved fan or air flow producing means mounted within a cross-flow cooling tower construction wherein the fan housing and its associated operating structure are completely submerged in the cooling tower with improved appearance characteristics and lessening of noise in operation.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

Figure 1:
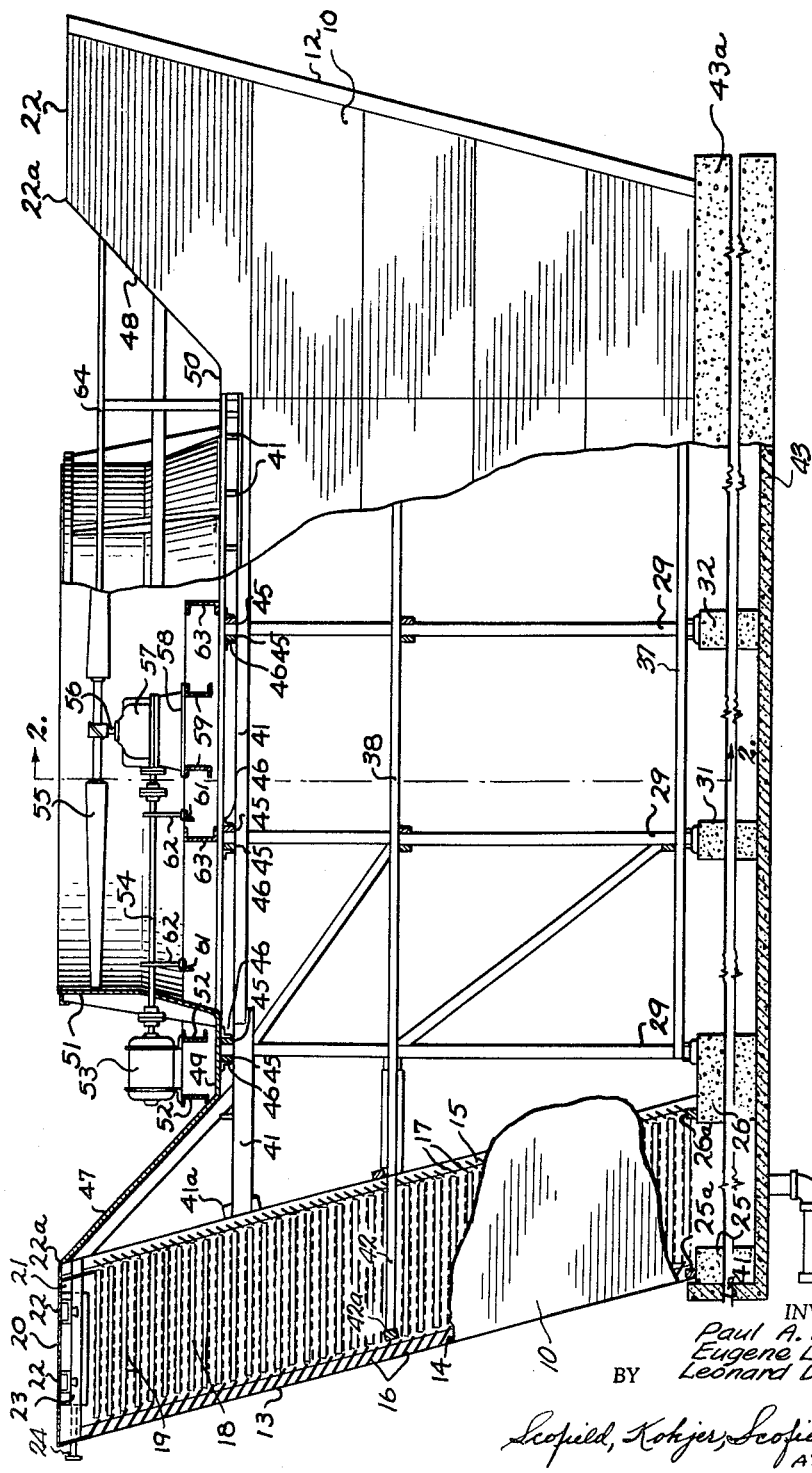
FIG. 1 is a side elevation of a cross-flow cooling tower construction embodying the invention with parts cut away and in section to better illustrate the internal construction.
Figure 2:
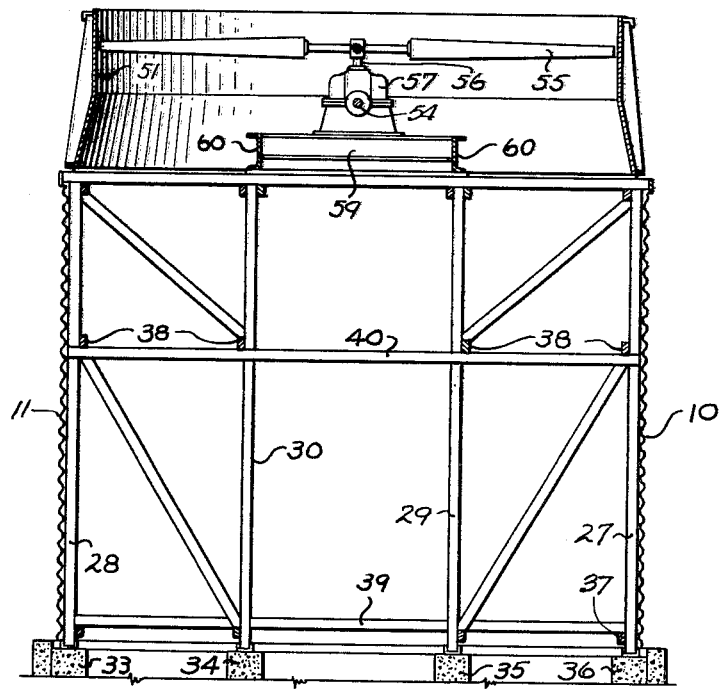
FIG. 2 is a view taken at right angles to FIG. 1 along the line 2—2 of FIG. 1 in the direction of the arrows.

Referring particularly to FIGS. 1 and 2, therein is shown a cooling tower construction embodying the instant improvement. The cooling tower itself comprises, as shown, a rectangular (in plan view) housing tower having relatively greater length end walls 10 and 11 connecting at their ends to relatively lesser length (or width) side walls 12 and 13. End walls 10 and 11 are sealed to air flow by suitable conventional asbestos cement board or reduced sheathing or sheeting or the like, while side walls 12 and 13 are preferably louvered openings with heat exchange flow decking structure therein as follows.

A plurality of paired, opposed, laterally and inwardly spaced, near vertically extending beams 14 and 15 comprise decking structurals which carry in formed grooves therein a multiplicity of inwardly, downwardly slanted staves or boards 16 and 17. The former members 14 and 15 support therebetween in conventional manner a plurality of horizontally extending decking members 18, themselves beams or boards. Mounted transversely above and carried by decking members 18 are a multiplicity of elongate, horizontally extended slats 19 fixed to said decking members 18 and extending normal thereto with flow gaps or spaces therebetween. The decking structure just described extends end wall to end wall in the sides. Positioned under the flow top sealing wall 20 of the tower housing and over the decking construction described, rigidly fixed in spaced relationship thereto by any sort of suitable horizontally structurals 21 (themselves supported by members 14 and 15) are spray nozzles 22 of any desired type, fed from manifold 23 to which input pipe 24 is connected. At the bottom of members 14 and 15, same are supported on suitable transverse structurals of concrete, metal beams, or the like 25 and 26. Additional transverse wooden structurals 25a and 26a join adjacent members 14 and 15, respectively. The right-hand side structure of FIG. 1 is identical to the left-hand side structure of FIG. 1 and thus is not shown in section.

Referring additionally to FIG. 2, a plurality of vertical side structurals 27 and 28 support the flow sealing sheeting forming the outer ends 10 and 11 and have inwardly spaced therefrom any desired number of regularly spaced other vertical structurals 29 and 30. A number of diagonal structurals may be employed as desired (and as shown) between the side and central structurals, not numbered here because many diagonal braced structural frameworks will suffice. Transverse footings 26, 31 and 32 (FIG. 1) support the vertical structurals which they underlie, while longitudinal footings 33–36, inclusive, further support the vertical structurals which they underlie connecting with footings. Suitable side horizontal beams or structurals (as seen at 37 and 38 in FIG. 1) join the side verticals (such as 27 in FIG. 1), while suitable transverse horizontal structurals (as seen at 39 and 40 in FIG. 2) interconnect the center verticals with the side verticals. Thus the center chamber of the tower housing between the opposed splash deckings is filled with an open structural array for purposes to be described.

Suitable conventional connections are made between the inner semi-vertical members 15 and the tower central chamber structurals as seen in FIG. 1 at 41, connecting at an upper lever and at 42 and 42a therebelow to the outside members 16 from horizontal 38. Such connections will not be further detailed as they are conventional.

Schematically designated and underlying the entire tower housing is a collecting tray 43 having a vertical rim 43a circumferentially therearound and a sump drain 44. This, additionally, is supported by suitable conventional crisscross horizontal structurals, not shown.

All of the above described structure is quite conventional with respect to a cross-flow cooling tower and various modifications in variation and structure may be employed. It should be clearly understood that one opening or open side of the cooling tower housing in one side 12 or 13 thereof could be sealed off inside of the tower (or outside thereof) whereby to have air flow only through said one side thereof. The structure illustrated is a two-sided cross-flow cooling tower.

Downwardly slanted baffles 47 and 48 sealingly (air flow) communicate from the inside edges of the housing top walls 22 as at 22a to flat horizontal decking portions 49 and 50. Baffles 47 and 48 communicate entirely across the width of the housing between end walls 10 and 11. Deckings 49 and 50 are supported on joists 41 and connect to the lower edge of an upstanding semi-cylindrical fan housing 51. Suitable transverse structurals 52 carry fan motor 53 with drive shaft 54. The gearing of fan blades 55 which are mounted on shaft 56 is received in housing 57, the latter mounted on platform 58 carried by transverse structurals 59. Platform 58 is additionally carried by longitudinal structurals 60 which also mount small angles 61 which carry safety guards 62 for shaft 55. Additional transverse structurals 63 aid in supporting the mechanical equipment immediately thereabove.

Suitable protective railings 64 are mounted preferably at the sides of the recess in the top of the housing created by the downward inclination of baffles 47 and 48, which recess provides convenient sheltered inspection space at the sides of fan housing 51. Any suitable ladder means may communicate up to the recessed fan housing deck in the tower housing from either one of ends 10 or 11.

Primarily for appearance purposes and the advantage of minimum height, fan housing 51 is preferably sufficiently recessed in the tower housing that its top edge is aligned with or positioned below the top walls 20 of the tower housing. However, it is immaterial for one advantage of this improvement how sufficiently the fan housing 51 and fan 55 are themselves recessed in the tower housing, so long as baffles 47 and 48 extend downwardly (in the tower housing between the fan draw chamber [therebelow] and the splash decks) sufficiently to at least substantially compensate for the difference in fan air draw or pull between the top decking levels and the bottom decking levels. There are two factors to be considered with respect to baffles 47 and 48. The first is the amount of downward extension of baffles 47 and 48 into the housing structure relative to the spray decks. The optimum such downward extension is to the midpoint of the fill height or only slightly thereabove. The latter extension is optimum for any angle of the baffles to the decking end walls where there is no undue resistance to flow through the upper decking portions. The best performance of the tower is achieved where equal air flow is provided across the entire fill height. Loss of optimum performance comes from excessive flow velocity at either the top or the bottom of the decking. However, optimum performance depreciates more quickly with excessive flow velocity at the bottom than at the top.

It is seen that a central chamber exists, in the structure described, between the two sets of spray deckings at opposite sides of the tower housing and below the fan, its housing and baffles 47 and 48. Fan 55 preferably overlies the centermost central portion of this central vertical passage or chamber between the spray decking sets or series whereby to force air vertically therefrom, thereby effecting a horizontal draw of air through the deckings. Thus flow is guided, regulated and channeled by the baffles 47 and 48, and the decking portions 49 and 50, in nonturbulent flow from outside the tower housing into fan housing 51.

The angle of inclination from the vertical of baffles 47 and 48 must be greater than the angle of inclination from the vertical of members 14 and 15 whereby to give at least some air flow access from the top level splash decks. By varying the angle from the vertical of baffles 47 and 48 with respect to the same angle of members 15, for a given depth of baffles 47 and 48 in the tower housing, variations in input air flow balance from the vertically spaced decks are achieved. We have discovered in a tower of structure analogous to that depicted that the optimum baffle angle range between members 15 and baffles 47 and 48 to be approximately 30° plus or minus 10° or so. A certain minimum angle between the members 15 and baffles 47 and 48 must be maintained. This minimum angle is approximately 15°.

Figure 3:
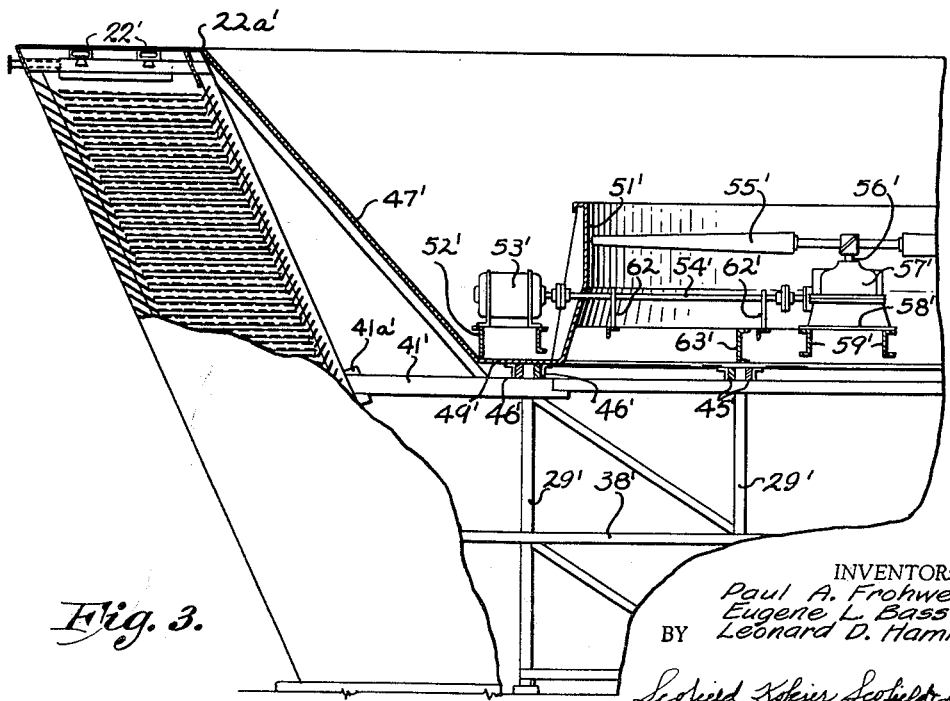
FIG. 3 is a fragmentary view similar ot that of FIG. 1 but showing a revised mounting for the fan construction, its housing and the baffles associated therewith.

If baffles 47 and 48 are extended downwardly into the structure in the manner shown in FIG. 3, it is usually necessary to separate the sets of splash deckings from one another by a greater distance (for the same size baffles 47 and 48, decks 49 and 50 and fan housing 51) thereby making a greater base area necessary for a given size cooling tower. Thus, while it is possible to completely equalize flow of air into the various (upper and lower) decks of each splash decking set by moving the baffling (and optionally but preferably) the fan housing downwardly into the tower housing so the vertical length of baffles 47 and 48 is approximately half the height of the cooling tower, a compromise is usually made in the manner of FIG. 1 whereby a flow equalization improvement is obtained yet inward flow is not completely vertically equalized. In such case, however, an objectionable excess of volume increase in the tower or increased floor area thereof is not required. As above mentioned, complete fan housing recess is preferable.

In order to minimize flow interruption, induced drag, turbulence, etc., it is desirable to have at least a certain width of each of deckings 49 and 50 horizontal in extension prior to connection to fan housing 51 or any extension of the latter. This avoids a sharp turn in the air flow. Additionally, it is desirable to round off the junctures between baffles 47 and 48 and fan housing 51, also as shown, to minimize each turbulence, drag increase, etc.

The construction of FIG. 3 illustrates, as previously mentioned, the complete equalization of the air flow between each of the vertical splash deckings. Parts identical to parts in FIG. 1 are numbered the same, but primed.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A cross flow cooling tower comprising a tower housing, a series of vertically spaced horizontally extending decks positioned in one open side of the tower housing, means for passing water to be cooled downwardly through said vertically spaced decks, a fan associated with said tower housing for producing a flow of air in a horizontal direction through said one open side of said tower housing and between said decks therein whereby to cool said downwardly passing water, said fan horizontally oriented with respect to said tower housing and having a circumferential fan housing therearound, said fan housing and fan mounted within said tower housing in a recessed position in same adjacent said deck series, means for mounting said fan housing and fan in said tower housing, said fan positioned adjacent the upper portion of said housing and baffle means between the upper ones of said decks and said fan said baffle means communicating between the top of said tower housing and the bottom of said fan housing, thereby to substantially equalize the drawing pressure of the fan among said vertically spaced decks.

2. A construction as in claim 1 wherein the lowest point of said baffle means in said housing extends substantially horizontally.

3. A construction as in claim 1 wherein said baffle extends at a greater angle to the vertical than does said series of decks.

4. A cross-flow cooling tower comprising a tower housing, a series of vertically spaced substantially horizontally extending decks in the tower housing positioned in each of two open sides of said tower housing, means for passing water to be cooled downwardly through said vertically spaced deck series, a fan for producing a flow of air in a horizontal direction through said two open sides of said tower housing between said decks in said series to cool said downwardly passing water therein, said fan positioned horizontally and surrounded by a fan housing, the fan housing and fan mounted within said tower housing in a recessed position in same adjacent both said deck series, means for mounting said fan housing and fan in said tower housing, said fan positioned between said deck series and adjacent the upper portion of said tower housing and acting to blow air upwardly from the portion of the tower housing between said deck series, and baffle means between upper ones of each of said series of decks and said fan housing, said baffle means extending between the top portion of said tower housing adjacent each said deck series and the bottom of said fan housing adjacent thereto, whereby to substantially equalize the drawing power of said fan among vertically spaced ones of said decks in each of said series.

5. A construction as in claim 4 wherein the two open sides of said housing and said deck series are opposed to one another, from which the air flows horizontally inwardly in two opposite directions toward a central portion of the housing and said fan is positioned at a central housing portion acting to blow air upwardly from said central portion to the atmosphere.

References Cited by the Examiner

UNITED STATES PATENTS

| Re. 21,185 | 8/39 | Fulweiler | 55—418 |
|---|---|---|---|
| 2,151,481 | 3/39 | Mart. | |
| 2,497,389 | 2/50 | Ahrens. | |
| 2,776,121 | 1/57 | Fordyce. | |
| 2,872,168 | 2/59 | Mart. | |
| 3,056,499 | 10/60 | Liddell. | |

FOREIGN PATENTS

| 841,089 | 7/60 | Great Britain. |
|---|---|---|
| 531,366 | 1/28 | Germany. |

GEORGE D. MITCHELL, *Primary Examiner.*

HERBERT L. MARTIN, *Examiner.*